United States Patent
Namkoong et al.

(10) Patent No.: US 8,235,073 B2
(45) Date of Patent: Aug. 7, 2012

(54) MICROFLUIDIC VALVE UNIT FOR CONTROLLING FLOW OF FLUID AND METHOD OF FABRICATING THE SAME

(75) Inventors: Kak Namkoong, Seoul (KR); Won-seok Chung, Hwaseong-si (KR); Joon-ho Kim, Seongnam-si (KR); Kyu-youn Hwang, Yongin-si (KR); Hee-kyun Lim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 12/555,173

(22) Filed: Sep. 8, 2009

(65) Prior Publication Data

US 2010/0186839 A1    Jul. 29, 2010

(30) Foreign Application Priority Data

Jan. 29, 2009    (KR) .................. 10-2009-0006987

(51) Int. Cl.
   *F15C 1/04* (2006.01)
(52) U.S. Cl. ............... 137/828; 137/829; 251/11
(58) Field of Classification Search .......... 137/74, 137/827, 828, 829, 834; 251/11
   See application file for complete search history.

(56) References Cited

U.S. PATENT DOCUMENTS

| | | | |
|---|---|---|---|
| 6,048,734 A | 4/2000 | Burns et al. | |
| 6,102,897 A | 8/2000 | Lang | |
| 6,302,134 B1 | 10/2001 | Kellogg et al. | |
| 6,536,476 B2 | 3/2003 | Ueno et al. | |
| 6,557,575 B1 | 5/2003 | Gerhardt et al. | |
| 7,195,036 B2* | 3/2007 | Burns et al. | 137/828 |
| 7,980,272 B2* | 7/2011 | Park et al. | 137/828 |
| 2005/0247356 A1 | 11/2005 | Welle | |
| 2006/0219308 A1* | 10/2006 | Oh et al. | 137/827 |
| 2007/0092409 A1 | 4/2007 | Beatty et al. | |
| 2007/0231216 A1 | 10/2007 | Park et al. | |
| 2007/0264628 A1 | 11/2007 | Park | |
| 2008/0029158 A1* | 2/2008 | Park et al. | 137/76 |

FOREIGN PATENT DOCUMENTS

| | | |
|---|---|---|
| KR | 10-0738113 B1 | 7/2007 |
| KR | 10-0763922 B1 | 10/2007 |
| KR | 1020080022027 A | 3/2008 |
| KR | 1020080022029 A | 3/2008 |

* cited by examiner

*Primary Examiner* — Craig Schneider
*Assistant Examiner* — Ian Paquette
(74) *Attorney, Agent, or Firm* — Sughrue Mion, PLLC (57) ABSTRACT

A microfluidic valve unit for controlling the flow of fluid flowing along a channel, and a method of fabricating the same are provided. The valve unit includes a channel formed in a platform; a valve filler which includes a phase transition material that is disposed in the channel in a solid state at room temperature to close the channel and is melted when energy is applied thereto; and at least one capillary channel which extends from a sidewall of the channel and into which the valve filler flows when the valve filler is melted, wherein the at least one capillary channel has a cross-sectional area which is less than a cross-sectional area of the channel.

13 Claims, 7 Drawing Sheets

MICROFLUIDIC VALVE UNIT FOR CONTROLLING FLOW OF FLUID AND METHOD OF FABRICATING THE SAME

CROSS-REFERENCE TO RELATED APPLICATION

This application claims the benefit of Korean Patent Application No. 10-2009-0006987, filed on Jan. 29, 2009, in the Korean Intellectual Property Office, the disclosure of which is incorporated herein in its entirety by reference.

BACKGROUND

1. Field

One or more embodiments relate to a microfluidic valve unit for controlling flow of a fluid through a channel, and a method of fabricating the same.

2. Description of the Related Art

Research is being actively conducted in the microfluidic engineering field on microfluidic devices capable of performing various functions using biochemical fluid such as blood, urine, saliva, sputum, etc., for example, performing a biochemical reaction process on the biochemical fluid and detecting results of the reaction process. A microfluidic device may be a chip type such as a lab-on-a-chip or a disk type such as a lab-on-a-disk. A microchannel for transporting fluid is formed in the microfluidic device and a microfluidic valve unit for controlling the flow of the fluid flowing along the microchannel may be included in the microfluidic device.

However, the microfluidic valve unit requires a large amount of wax for closing the microchannel and/or a large heating device for melting the wax, and thus it is difficult to miniaturize and highly integrate the microfluidic device. Also, a lot of time is required to heat wax to be melted and it is difficult to accurately control a point of time when the microchannel becomes open due to the melting of the wax.

SUMMARY

One or more embodiments include a microfluidic valve unit formed of a phase transition material and capable of accurately controlling a point of time when a channel becomes open, and a method of fabricating the same.

One or more embodiments include a microfluidic valve unit capable of easily opening a channel without centrifugal force or pressure of fluid, and a method of fabricating the same.

According to an aspect of one or more embodiments, there is provided a valve unit including a channel for in a platform; a valve filler which includes a phase transition material that is disposed in the channel in a solid state at room temperature to close the channel and is melted when energy is applied thereto; and at least one capillary channel which extends from a sidewall of the channel and into which the valve filler flows when the valve filler is melted, wherein the at least one capillary channel has a cross-sectional area less than a cross-sectional area of the channel.

The channel may include a protrusion portion having a first channel depth, and channel groove portions disposed on opposite sides of the protrusion portion and having a second channel depth greater than the first channel depth so that the protrusion portion forms a step with respect to the channel groove portions, the at least one capillary channel may extend from the sidewall of the protrusion portion; and the valve filler may be disposed and hardened in the protrusion portion, so as to close the channel.

The valve unit may further include a ventilation hole formed at an end of the at least one capillary channel, and the ventilation hole may be opened while the valve filler is melted.

The valve unit may further include an injection hole through which the valve filler is injected into the channel.

The injection hole may be closed after the valve filler is injected into the channel.

The at least one capillary channel may include a plurality of capillary channels formed on both of two opposite sidewalls of the channel or one of the two opposite sidewalls of the channel.

The phase transition material of the valve filler may include wax, gel, or thermoplastic resin.

The wax may include at least one selected from the group consisting of paraffin wax, microcrystalline wax, synthetic wax, and natural wax.

The gel may include at least one selected from the group consisting of polyacrylamide, polyacrylates, polymethacrylates, and polyvinylamides.

The thermoplastic resin may include at least one selected from the group consisting of cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF).

The valve filler may further include a plurality of minute heating particles which are dispersed in the phase transition material and emit heat by absorbing energy.

The minute heating particles may include particles of a metal oxide.

The metal oxide may include at least one selected from the group consisting of $Al_2O_3$, $TiO_2$, $Ta_2O_3$, $Fe_2O_3$, $Fe_3O_4$, and $HfO_2$.

The minute heating particles may include polymer particles, quantum dots, or magnetic beads.

According to another aspect of one or more embodiments, there is provided a method of fabricating a valve unit, the method including forming a channel in a platform; forming at least one capillary channel which extends from a sidewall of the channel and has a cross-sectional area which is less than a cross-sectional area of the channel; disposing a valve filler which is in a molten state in an area of the channel on which an inlet of the at least one capillary channel is formed, wherein the valve filler includes a phase transition material that is in a solid state at room temperature and is melted when energy is applied thereto; and hardening the valve filler so as to close the channel.

The forming of the channel may include forming the channel to include a protrusion portion having a first channel depth, and channel groove portions disposed on opposite sides of the protrusion portion and having a second channel depth which is greater than the first channel depth so that the protrusion portion forms a step with respect to the channel groove portions, and the forming of the capillary channel may include forming the at least one capillary channel to extend from the sidewall of the protrusion portion.

The forming of the at least one capillary channel may further include forming a ventilation hole at an end of the capillary channel, and the method may further include closing the ventilation hole while the valve filler is being disposed and hardened.

The method may further include forming an injection hole connected to the channel, and the disposing of the valve filler may include injecting the valve filler in the molten state through the injection hole.

The method may further include closing the injection hole after the valve filler is disposed.

The forming of the capillary channel may include forming a plurality of capillary channels on both of two opposite sidewalls of the channel or one of the two opposite sidewalls of the channel.

BRIEF DESCRIPTION OF THE DRAWINGS

The and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. In this regard, the current embodiments may have different forms and should not be construed as being limited to the descriptions set forth herein. Accordingly, the embodiments are merely described below, by referring to the figures, to explain aspects of the present description.

Figure 1A:
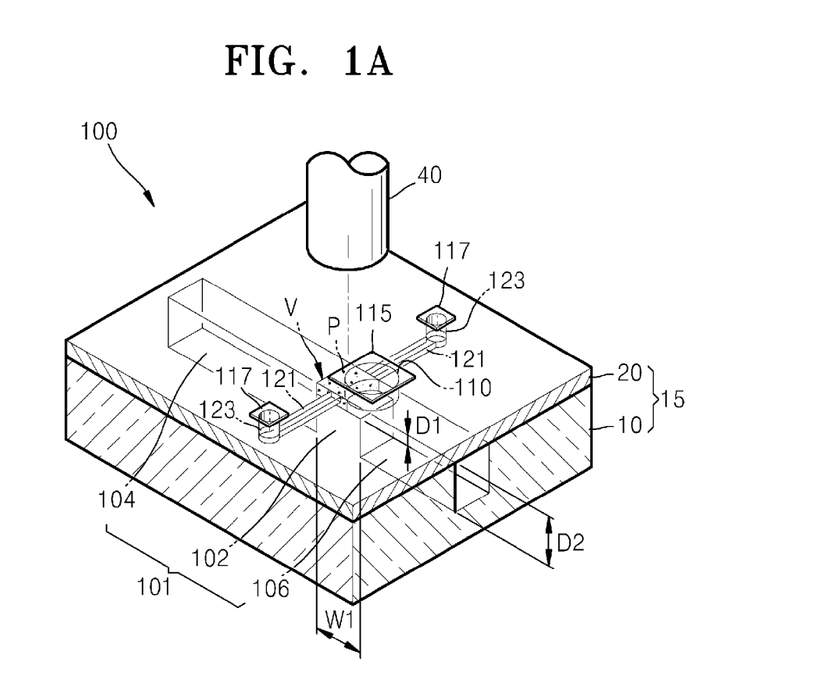
FIG. 1A is a perspective view of a valve unit according to an embodiment.
Figure 1B:
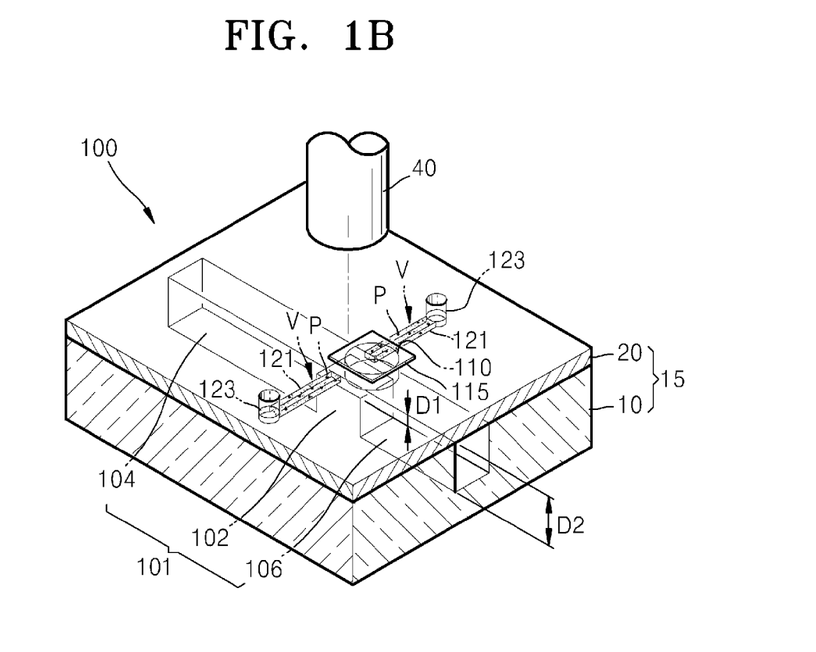
FIG. 1B illustrates an open state of the valve unit illustrated in FIG. 1A.

FIG. 1A is a perspective view of a valve unit 100 according to an embodiment, FIG. 1B illustrates an open state of the valve unit 100 illustrated in FIG. 1A, and FIGS. 2A through 2D are plan views of modified examples of the valve unit 100 illustrated in FIG. 1A, according to other embodiments.

Referring to FIG. 1A, the valve unit 100 according to the current embodiment includes a channel 101 formed in a platform 15 for transporting fluid, a valve filler V for closing the channel 101, and capillary channels 121 which extend from sidewalls of the channel 101 and into which the valve filler V in a molten state flows. Also, the valve unit 100 further includes an injection hole 110 for injecting the valve filler V into the channel 101 in order to close the channel 101.

The channel 101 includes a protrusion portion 102 which is partially overlapped by the injection hole 110, and channel groove portions 104 and 106. The protrusion portion 102 has a first channel depth D1 and the channel groove portions 104 and 106 have a second channel depth D2. The second channel depth D2 is greater than the first channel depth D1 so that the protrusion portion 102 forms a step with respect to the channel groove portions 104 and 106. In FIG. 1, the first channel depth D1 may be about 0.1 mm and the second channel depth D2 may be about 1 mm. The channel groove portions 104 and 106 are separated by the protrusion portion 102. A valve region A (see FIG. 4A) constitutes a section of the channel 101 in which the protrusion portion 102 is formed, wherein the valve region A does not overlap the injection hole 110. The channel 101 is closed, for example, by the valve filler V disposed in the valve region A. After the valve filler V is injected into the channel 101 through the injection hole 110 and is hardened in the valve region A (see FIG. 4C), the injection hole 110 is closed by transparent adhesive tape 115 in order to prevent the valve filler V from flowing out of the valve region A. Although the transparent adhesive tape 115 is described as an exemplary element for closing the injection hole 110, the current embodiment is not limited thereto.

The capillary channels 121 extend from the sidewalls of the channel 101. In more detail, inlets 121a (see FIG. 4A) of the capillary channels 121 are formed in sidewalls of the valve region A in which the valve filler V is disposed in order to close the channel 101. Ventilation holes 123 are formed at ends of the capillary channels 121. The ventilation holes 123 are closed by transparent adhesive tape 117 when the valve filler V is injected into the channel 101, in order to prevent the valve filler V injected into the channel 101 from flowing into the capillary channels 121 instead of remaining in the valve region A. The ventilation holes 123 are opened by removing the transparent adhesive tape 117 before the valve filler V is melted again after being hardened in the valve region A. Although the transparent adhesive tape 117 is described as an exemplary element for closing the ventilation holes 123, the current embodiment is not limited thereto.

Figure 4A:
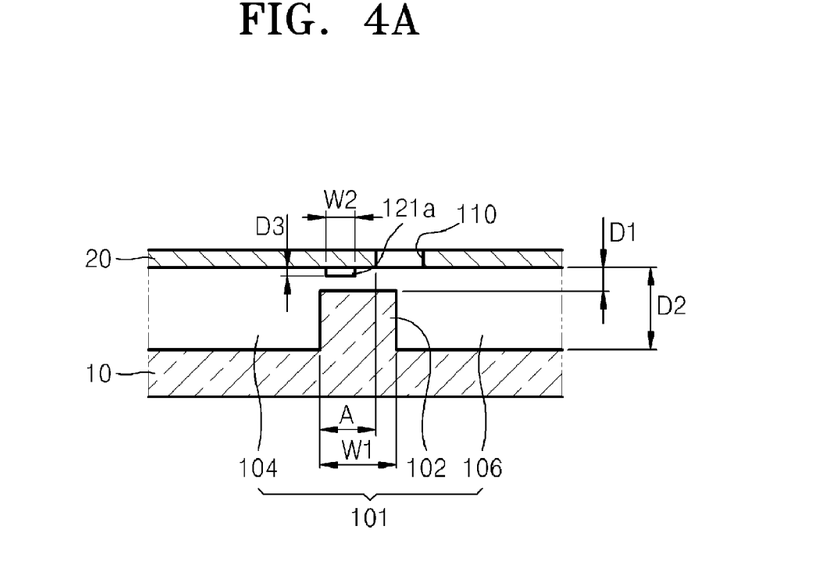
FIGS. 4A through 4C are cross-sectional views sequentially illustrating a method of fabricating the valve unit illustrated in FIG. 1A, according to an embodiment.

In order to allow molten valve filler V to flow in the capillary channels 121 by capillary force when the ventilation holes 123 are opened, the capillary channels 121 are formed to have a cross-sectional area that is smaller than the cross-sectional area of the protrusion portion 102, and more particularly, the cross-sectional area of the valve region A (see FIG. 4A). In FIGS. 1A and 1B, a depth of the valve region A is equal to the first channel depth D1 and a depth D3 (see FIG. 4A) of the capillary channels 121 is smaller than the first channel depth D1. Also, a width of the valve region A is smaller than a length in the flow direction W1 of the channel 101 and a width W2 (see FIG. 4A) of the capillary channels 121 is smaller than the length in the flow direction W1 of the channel 101.

Figure 2A:
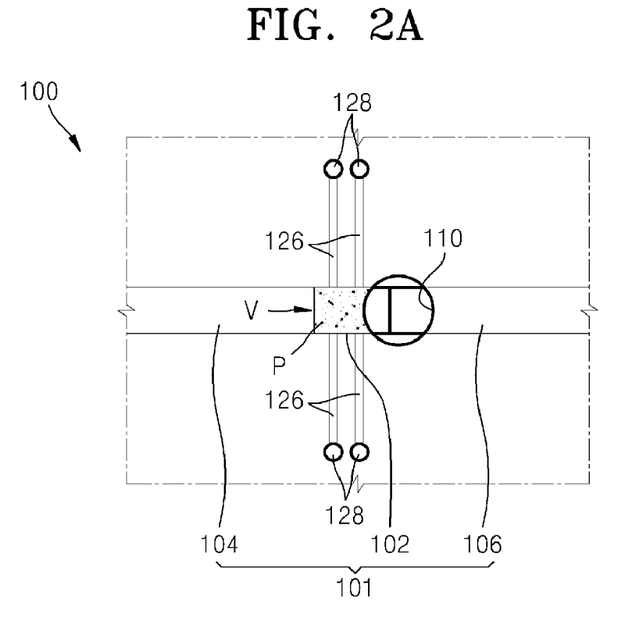
FIGS. 2A through 2D are plan views of modified examples of the valve unit illustrated in FIG. 1A, according to other embodiments.
Figure 2B:
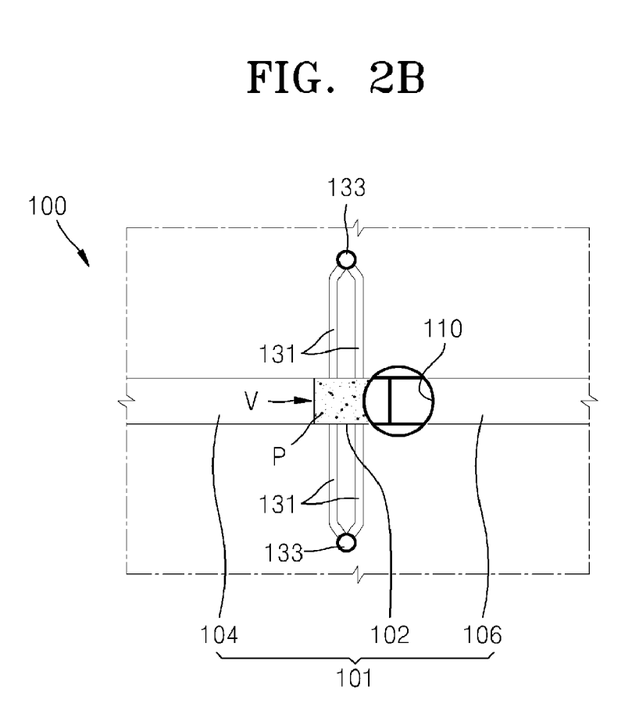
Figure 2C:
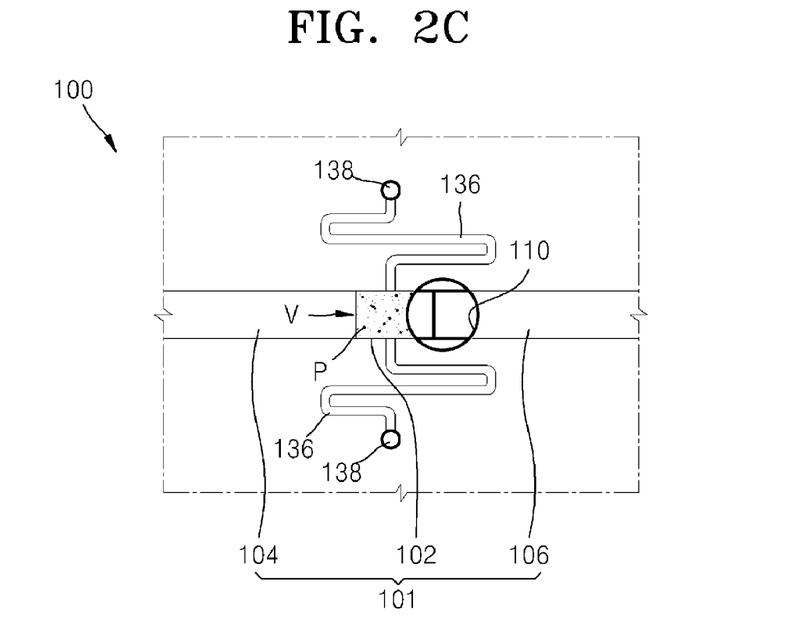
Figure 2D:
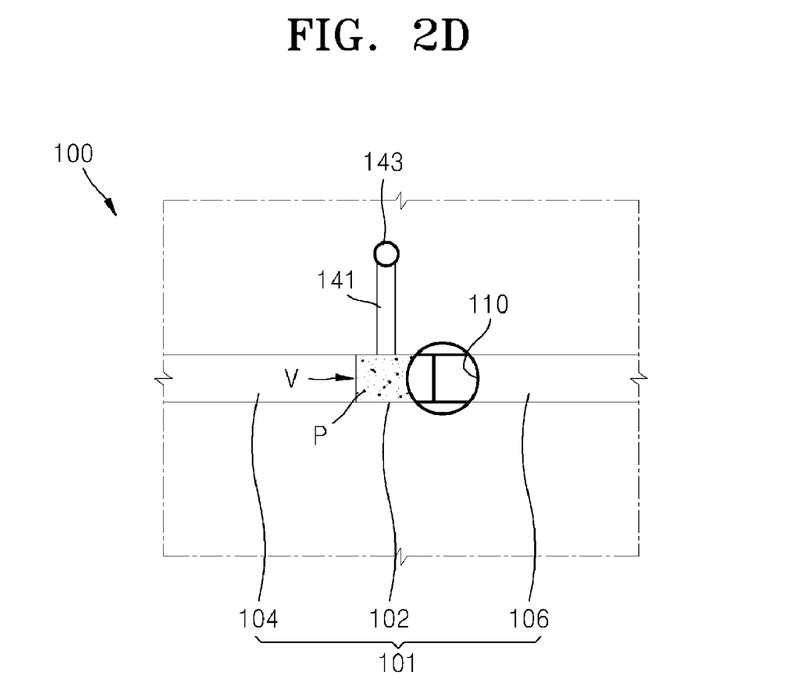

Referring to FIGS. 2A through 2D, the valve unit 100 may include various configurations of capillary channels 126, 131, 136, or 141 according to other embodiments. Referring to FIG. 2A, the capillary channels 126 may be formed in two sidewalls of the channel 101 and a pair of capillary channels 126 may be formed in each sidewall. A ventilation hole 128 may be formed at an end of each of the capillary channels 126. Referring to FIG. 2B, the capillary channels 131 may be formed in two sidewalls of the channel 101 and a pair of capillary channels 131 may be formed in each sidewall. However, unlike FIG. 2A, ends of a pair of neighboring capillary channels 131 are combined with each other and a ventilation hole 133 may be formed at a combined end of each pair of capillary channels 131. Referring to FIG. 2C, the capillary channels 136 may be formed in two sidewalls of the channel 101. The capillary channels 136 may have a zigzag structure. Referring to FIG. 2D, only one capillary channel 141 may be formed in one of two opposite sidewalls of the channel 101. A ventilation hole 143 may be formed at an end of the capillary channel 141.

Referring back to FIG. 1A, the channel 101, the injection hole 110, the capillary channels 121, and the ventilation holes 123 are formed in lower and upper plates 10 and 20 bonded together to form the platform 15. In more detail, the protrusion portion 102 and the channel groove portions 104 and 106 of the channel 101, and the capillary channels 121 may be formed by etching or micromachining an upper surface of the lower plate 10, and the injection hole 110 and the ventilation holes 123 may be formed by micromachining an upper surface of the upper plate 20. The lower and upper plates 10 and 20 may be bonded by using double-sided adhesive tape, or by performing an oxygen ($O_2$) plasma process or an anodic bonding process according to materials forming the lower and upper plates 10 and 20.

Referring to FIG. 1B, the valve filler V hardened in the valve region A (see FIG. 4C) is melted when it absorbs energy applied thereto. In this case, if the ventilation holes 123 are opened, the molten valve filler V flows into the capillary channels 121 through the inlets 121a (see FIG. 4A). As such, the channel 101 may be opened without applying an external force such as centrifugal force or pressure of fluid flowing through the channel 101. The valve filler V may be melted by energy of a laser irradiated from an energy source such as a laser source 40. The laser source 40 is only an example of an energy source for irradiated energy to the valve filler V and the current embodiment is not limited thereto.

The valve filler V includes a phase transition material that is in a solid state at room temperature and is melted when energy is absorbed, and a plurality of minute heating particles P that are dispersed in the phase transition material and emit heat by absorbing energy.

The phase transition material may be wax. When heated, the wax is melted so as to assume a liquid state, and is volume-expanded. The wax may be, for example, paraffin wax, microcrystalline wax, synthetic wax, or natural wax.

The phase transition material may be gel or thermoplastic resin. The gel may be, for example, polyacrylamide, polyacrylates, polymethacrylates, or polyvinylamides. Also, the thermoplastic resin may be, for example, cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), or polyvinylidene fluoride (PVDF).

The minute heating particles P have minute diameters so as to freely pass through the channel 101 and the capillary channels 121. When electromagnetic wave energy is irradiated on the minute heating particles P by using, for example, a laser irradiation method, the temperature of the minute heating particles P rapidly increases so that the minute heating particles P emit heat. The minute heating particles P are uniformly dispersed in the wax. To achieve these characteristics, each of the minute heating particles P may include a core containing a metal component, and a hydrophobic surface structure. For example, each of the minute heating particles P may have a molecular structure including a core formed of iron (Fe), and a plurality of surfactant components that cover and are combined with Fe.

The minute heating particles P are not limited to polymer particles exemplarily described above and may be formed of quantum dots or magnetic beads. Also, the minute heating particles P may be metal oxide particles, wherein the metal oxide may be $Al_2O_3$, $TiO_2$, $Ta_2O_3$, $Fe_2O_3$, $Fe_3O_4$, or $HfO_2$. The valve filler V may not necessarily include the minute heating particles P and may be formed of only the phase transition material without the minute heating particles P.

If laser is irradiated on the hardened valve filler V by using the laser source 40, the minute heating particles P included in the valve filler V rapidly emit heat and thus the phase transition material is rapidly heated. Accordingly, the valve filler V is rapidly melted and flows into the capillary channels 121 such that the channel 101 is opened and fluid may flow along the channel 101.

Figure 3:
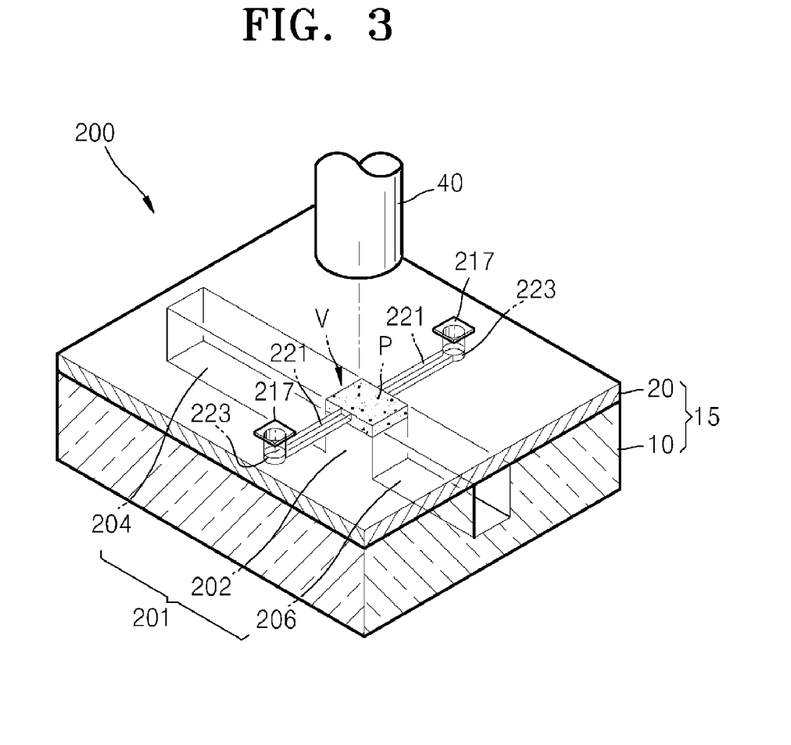
FIG. 3 is a perspective view of a valve unit according to another embodiment.

FIG. 3 is a perspective view of a valve unit 200 according to another embodiment. Like the valve unit 100 illustrated in FIG. 1A, the valve unit 200 according to the current embodiment includes a channel 201 that includes a protrusion portion 202 and channel groove portions 204 and 206, a valve filler V that is disposed in the protrusion portion 202 and closes the channel 201 when hardened, and capillary channels 221 that are formed in sidewalls of the channel 201 and into which the valve filler V melted by laser irradiated from a laser source 40 flows. Ventilation holes 223 formed at ends of the capillary channels 221 are closed by transparent adhesive tape 217 but are opened before a laser is irradiated on the valve region A in order to open the channel 201.

Figure 4B:
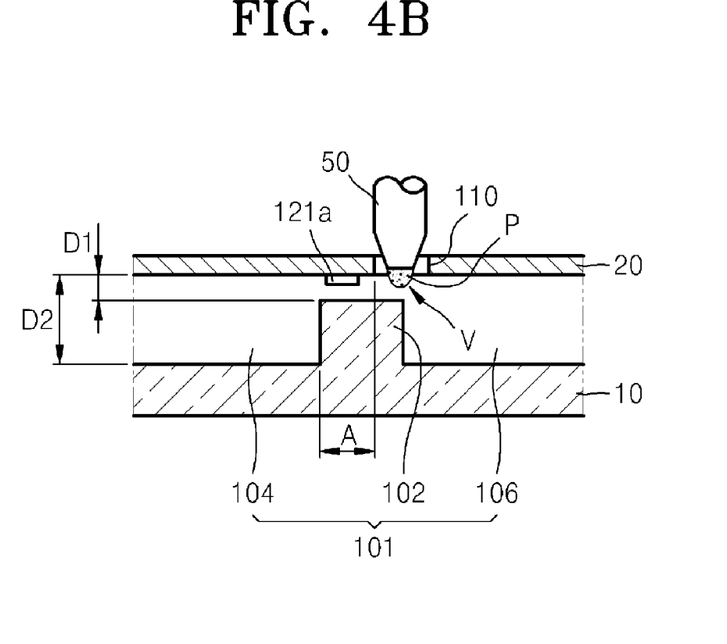
Figure 4C:
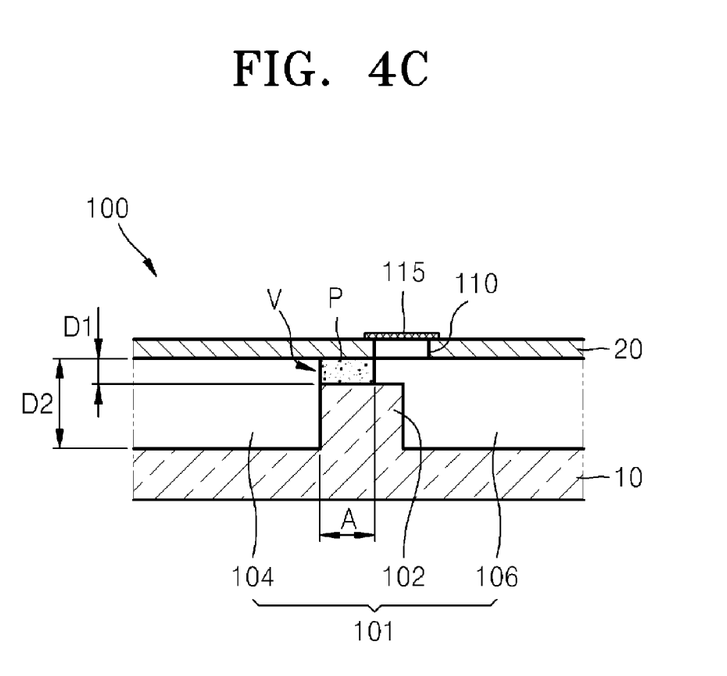

FIGS. 4A through 4C are cross-sectional views sequentially illustrating a method of fabricating the valve unit 100 illustrated in FIG. 1A, according to an embodiment.

The method of fabricating the valve unit 100 according to the current embodiment includes forming the channel 101, forming the capillary channels 121, forming the injection hole 110, disposing the valve filler V in the valve region A, hardening the valve filler V, and closing the injection hole 110.

Referring to FIG. 4A, the channel 101 is formed with the protrusion portion 102 and the channel groove portions 104 and 106 such that the channel 101 has a first channel depth D1 in the protrusion portion 102 and has a second channel depth D2 in the channel groove portions 104 and 106. The second channel depth D2 is greater than the first channel depth D1 so the protrusion portion 102 forms a step with respect to the channel groove portions 104 and 106. The capillary channels 121 are formed to extend from sidewalls of the portion of the channel 101 below which the protrusion portion 102 is disposed; and the ventilation holes 123 are formed at ends of the capillary channels 121. The channel 101 and the capillary channels 121 may be formed by etching or micromachining the lower plate 10, and the injection hole 110 and the ventilation holes 123 may be formed by micromachining the upper plate 20. The lower plate 10 in which the channel 101 and the capillary channels 121 are formed and the upper plate 20 in which the injection hole 110 and the ventilation holes 123 are formed are bonded together. Methods of forming the channel 101, the capillary channels 121, the injection hole 110, and the ventilation holes 123, and a method of bonding the lower and upper plates 10 and 20 are described above in detail with reference to FIG. 1A and thus descriptions thereof will not be repeated.

Referring to FIG. 4B, a small amount of the valve filler V is injected in a molten state into the channel 101 through the injection hole 110 by using a dispenser 50. The valve filler V is injected in a molten state due to being melted at high temperature prior to injection. The injected molten valve filler V flows into the valve region A by capillary force. In order to prevent the injected valve filler V from flowing into the capillary channels 121 through the inlets 121a, the ventilation holes 123 are closed by the transparent adhesive tape 117 before the valve filler V is injected. The valve filler V is described above in detail with reference to FIGS. 1A and 1B and thus a description thereof will not be repeated.

Referring to FIG. 4C, the valve filler V disposed in the valve region A is hardened at room temperature to thereby close the channel 101. After the valve filler V is injected into the channel 101 and then is hardened, the injection hole 110 may be closed by the transparent adhesive tape 115.

Figure 5A:
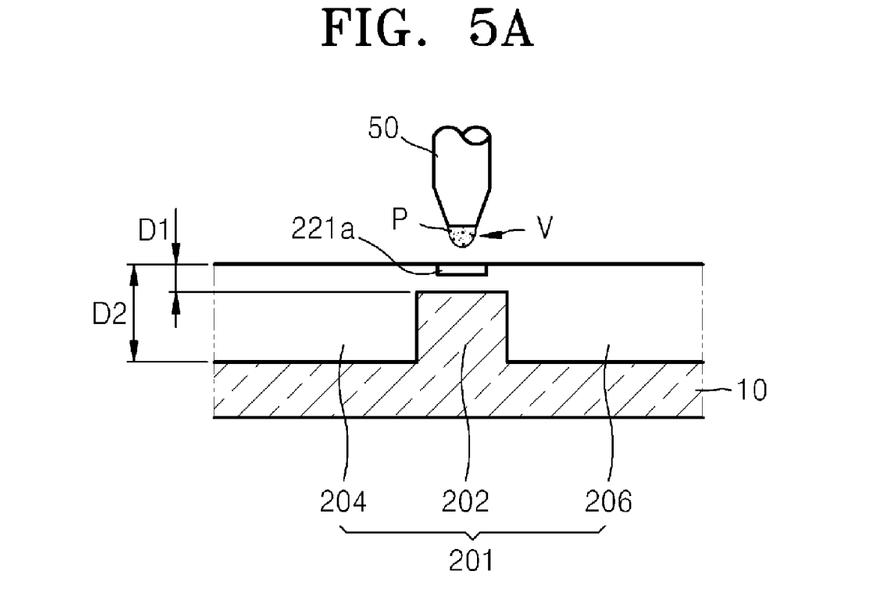
FIGS. 5A through 5C are cross-sectional views sequentially illustrating a method of fabricating the valve unit illustrated in FIG. 3, according to an embodiment.
Figure 5B:
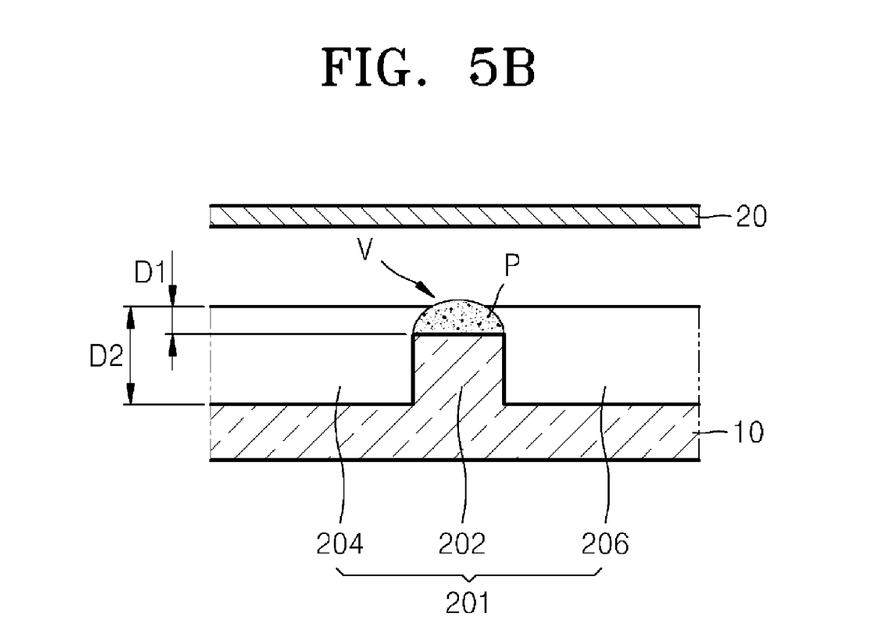
Figure 5C:
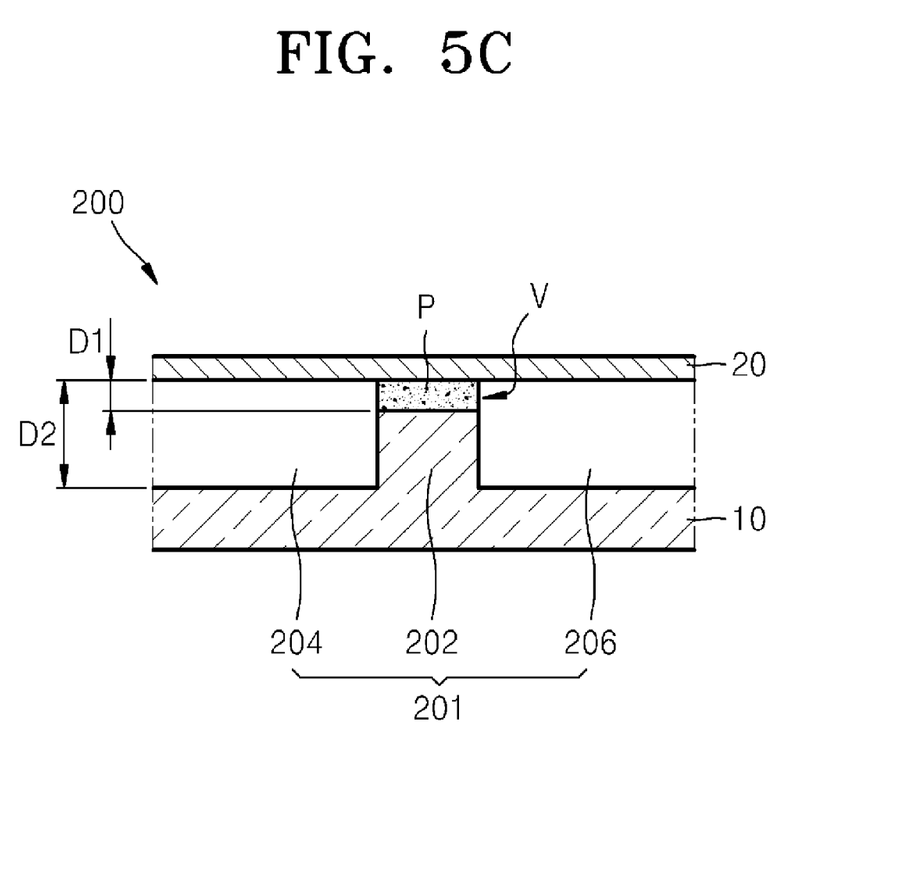

FIGS. 5A through 5C are cross-sectional views sequentially illustrating a method of fabricating the valve unit 200 illustrated in FIG. 3, according to an embodiment.

The method of fabricating the valve unit 200 includes forming the channel 201, forming the capillary channels 221, disposing the valve filler V in the protrusion portion 202, and hardening the valve filler V. Unlike the valve unit 100 including the injection hole 110 illustrated in FIG. 1A, the valve unit 200 does not include an injection hole.

Referring to FIG. 5A, the channel 201 is formed with the protrusion portion 202 and the channel groove portions 204 and 206 such that the protrusion portion 202 has a first channel depth D1 and the channel groove portions 204 and 206 have a second channel depth D2. The second channel depth D2 is greater than the first channel depth D1 so that the protrusion portion 202 forms a step with respect to the channel groove portions 204 and 206. The capillary channels 221 are formed to extend from sidewalls of the protrusion portion 202; and the ventilation holes 223 are formed at ends of the capillary channels 221. The channel 201 and the capillary channels 221 may be formed by etching or micromachining a lower plate 20, and the ventilation holes 223 may be formed by micromachining an upper plate 20. Methods of forming the channel 201, the capillary channels 221, the injection hole 210, and the ventilation holes 223 are described above in detail with reference to FIG. 3 and thus descriptions thereof will not be repeated.

Referring to FIG. 5B, a small amount of the valve filler V is deposited in a molten state in the protrusion portion 202, by using a dispenser 50. The valve filler V is in a molten state due to being melted at high temperature prior to being deposited. The valve filler V is described above in detail with reference to FIGS. 1A and 1B and thus a description thereof will not be repeated.

Referring to FIG. 5C, the lower and upper plates 10 and 20 are aligned and bonded together before the valve filler V disposed in the protrusion portion 202 is hardened. A method of bonding the lower and upper plates 10 and 20 is described above in detail with reference to FIG. 1A and thus a description thereof will not be repeated.

Referring to FIG. 5C, the valve filler V disposed in the protrusion portion 202 is hardened at room temperature to thereby close the channel 201.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A valve unit comprising:
    a channel formed in a platform, wherein the channel comprises a protrusion portion having a first channel depth, and channel groove portions disposed on opposite sides of the protrusion portion and having a second channel depth which is greater than the first channel depth so that the protrusion portion forms a step with respect to the channel groove portions;
    a valve filler which comprises a phase transition material that is disposed and hardened in the protrusion portion of the channel in a solid state at room temperature to close the channel and is melted when energy is applied thereto; and
    at least one capillary channel which extends from a sidewall of the protrusion portion of the channel and into which the valve filler flows when the valve filler is melted, wherein the at least one capillary channel has a cross-sectional area which is less than a cross-sectional area of the channel.

2. The valve unit of claim 1, further comprising a ventilation hole formed at an end of the at least one capillary channel, wherein the ventilation hole is opened while the valve filler is melted.

3. The valve unit of claim 1, further comprising an injection hole through which the valve filler is injected into the channel.

4. The valve unit of claim 3, wherein the injection hole is closed after the valve filler is injected into the channel.

5. The valve unit of claim 1, wherein the at least one capillary channel comprises a plurality of capillary channels formed on both of two opposite sidewalls of the channel or one of the two opposite sidewalls of the channel.

6. The valve unit of claim 1, wherein the phase transition material of the valve filler comprises wax, gel, or thermoplastic resin.

7. The valve unit of claim 6, wherein the wax comprises at least one selected from the group consisting of paraffin wax, microcrystalline wax, synthetic wax, and natural wax.

8. The valve unit of claim 6, wherein the gel comprises at least one selected from the group consisting of polyacrylamide, polyacrylates, polymethacrylates, and polyvinylamides.

9. The valve unit of claim 6, wherein the thermoplastic resin comprises at least one selected from the group consisting of cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF).

10. The valve unit of claim 1, wherein the valve filler further comprises a plurality of minute heating particles which are dispersed in the phase transition material and emit heat by absorbing energy.

11. The valve unit of claim 10, wherein the minute heating particles comprise particles of a metal oxide.

12. The valve unit of claim 11, wherein the metal oxide comprises at least one selected from the group consisting of $Al_2O_3$, $TiO_2$, $Ta_2O_3$, $Fe_2O_3$, $Fe_3O_4$, and $HfO_2$.

13. The valve unit of claim 10, wherein the minute heating particles comprise polymer particles, quantum dots, or magnetic beads.

* * * * *